United States Patent [19]

Arias

[11] Patent Number: 5,724,514

[45] Date of Patent: Mar. 3, 1998

[54] SYSTEM, METHOD AND APPARATUS FOR CONTROLLING THE TRANSFER OF DATA OBJECTS OVER A COMMUNICATIONS LINK

[75] Inventor: Armando Daniel Arias, San Bruno, Calif.

[73] Assignee: Netmanage, Cupertino, Calif.

[21] Appl. No.: 344,900

[22] Filed: Nov. 25, 1994

[51] Int. Cl.⁶ .......................... G06F 13/38; G06F 13/42; H04L 5/22

[52] U.S. Cl. .................. 395/200.13; 395/200.01; 395/200.11; 395/200.14

[58] Field of Search ................. 395/200.13, 200.15, 395/200.17, 200.18, 600; 364/239, 239.1, 239.3, 239.8

[56] References Cited

U.S. PATENT DOCUMENTS

| | | | |
|---|---|---|---|
| 4,860,193 | 8/1989 | Bentley et al. | 364/200 |
| 4,901,277 | 2/1990 | Soloway et al. | 364/900 |
| 5,088,032 | 2/1992 | Bosack | 395/200 |
| 5,410,694 | 4/1995 | Uchida et al. | 395/600 |
| 5,491,801 | 2/1996 | Jain et al. | 395/200.13 |
| 5,532,939 | 7/1996 | Psinakis et al. | 364/514 |

OTHER PUBLICATIONS

Davis, "Windows Network Progrsmming: How to survive in a World of Windows, DOS, and Networks," Chapter 6, the Windows Sockets API, pp. 203–239, Dec. 1993.

Tim Berners–Lee, "Hypertext Transfer Protocol (HTTP) Internet Draft," Nov. 5, 1993.

Tim Berners–Lee, "Universal Resource Identifiers in WWW: A Unifying Syntax for the Expression of Names and Addresses of Objects on the Network as used in the World–Wide Web (RFC 1630)," Jun., 1994.

Information Sciences Institute, "Internet Protocol DARPA Internet Program Protocol Specification (RFC 791)," Sep., 1981.

Information Sciences Institute, "Transmission Control Protocol DARPA Internet Protocol Specification (RFC 793)," Sep. 1981.

*Primary Examiner*—Alyssa H. Bowler
*Assistant Examiner*—Richard J. Gregson
*Attorney, Agent, or Firm*—Sawyer & Associates

[57] ABSTRACT

Control of the transfer of data objects over a communications link is achieved by obtaining a representative data object having an object size and a transfer time over the communications link. The object size of the representative data object is determined. The transfer time of the representative data object is determined. An effective transfer rate for the communications link is determined using the transfer time and object size. The effective transfer rate is compared to a predetermined value. A number of transfers to perform concurrently is determined based upon the comparison.

16 Claims, 10 Drawing Sheets

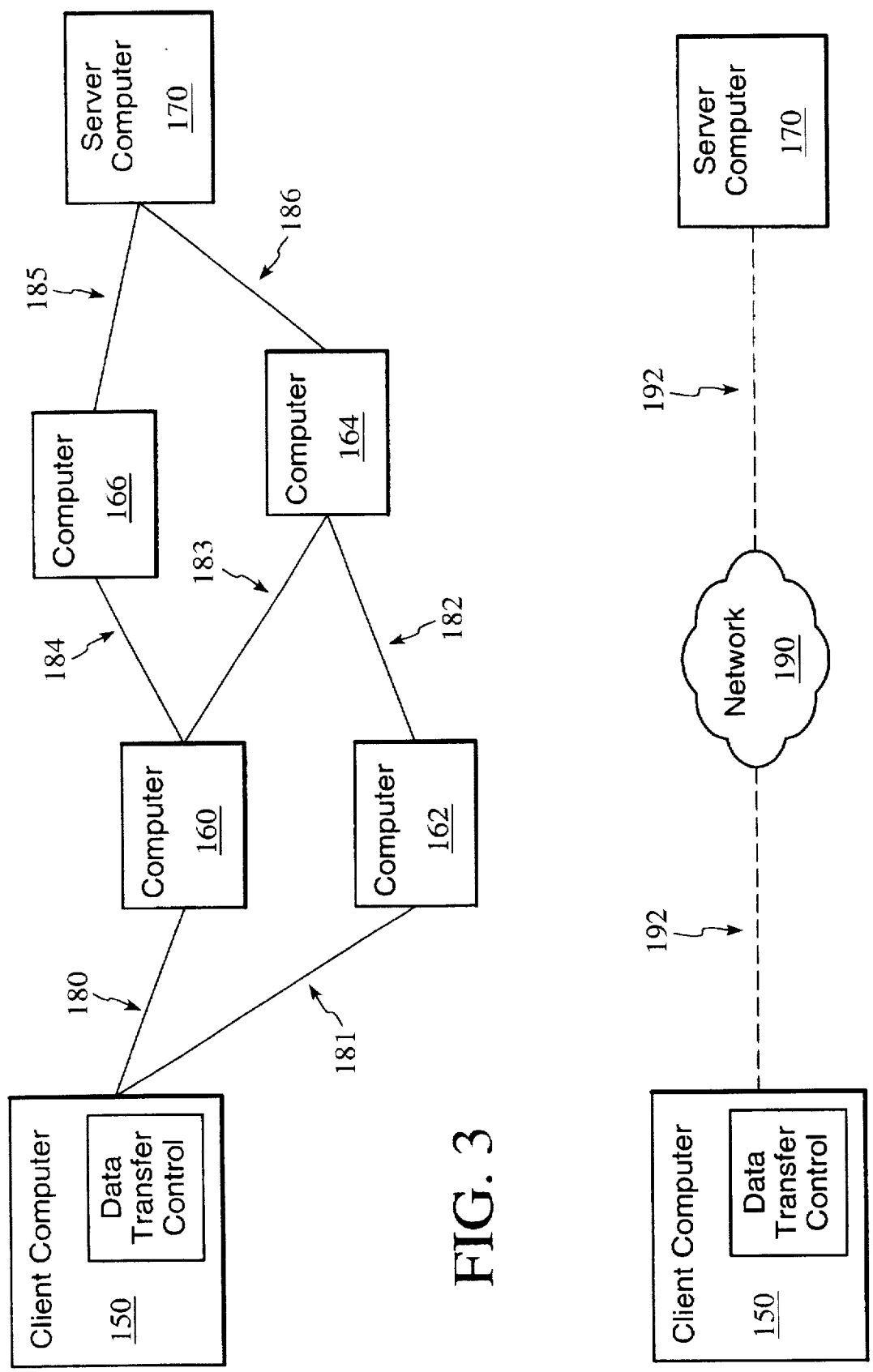

SYSTEM, METHOD AND APPARATUS FOR CONTROLLING THE TRANSFER OF DATA OBJECTS OVER A COMMUNICATIONS LINK

TECHNICAL FIELD

This invention relates to a system, method, and apparatus for controlling the transfer of data between a source computer and a destination computer over a communications link, and more specifically, to determining the effective data transfer rate between the computers and to selecting a process by which to transfer the data depending on the effective data transfer rate.

BACKGROUND

In computer systems, it is a common practice to specify a set of data to describe a presentation of information. Typically, the set of data is presented in the form of a primary data object. The primary data object specifies an overall description and form of the information to be presented. Often, the primary data object identifies one or more secondary data objects that are used to add particular pieces to the final rendered information.

An example of an approach that uses secondary data objects is a Hypertext Markup Language (HTML) document. In an HTML document, the primary data object is a text file. This text file contains a combination of 1) text to be displayed, 2) tags that provide formatting information, and 3) tags that identify secondary data objects. Typically, these secondary data objects are files that contain binary data. The binary data frequently represents image information to be integrated into a composite image. Generally, such secondary data objects will be large relative to the primary data object. Although the secondary data objects typically represent image data, the secondary data objects may be used to represent any form of data that may be presented to a user of a computer. Examples of such data include text, sound, and motion video.

FIG. 1 depicts a fragment 100 of an HTML-format document. The fragment shows eight lines 102, 104, 106, 108, 110, 112, 114, and 116. Lines 102 and 116 are HTML tags that provide formatting information. Line 102 specifies the beginning of the document body. Line 116 specifies the end of the document body. Lines 104, 106, 108, 110, 112, 114 and 116 provide information that must be "rendered" to form part of a composite image. As used in this context, "rendering" refers to the process of decoding the information described by the line and determining how it is to be displayed. Lines 104, 108, and 112 are "text render units"; the text in those lines will be displayed to a user as is. Lines 106, 110 and 114 are HTML tags that identify secondary data objects. Each refers to a secondary object that must be obtained, rendered and displayed as part of a complete display of the composite image.

A browser is a system that presents HTML documents to users of a computer. A browser obtains, renders, and displays such primary and secondary data objects. For example, once a graphical browser has rendered and displayed the HTML fragment 100 of FIG. 1, the result will be as illustrated in FIG. 2. In this figure, a composite image 120 is shown to include lines of text 124, 128, and 132 corresponding to text render units 104, 108 and 112 in FIG. 1 and graphical images 126, 130 and 134 corresponding to HTML tags 106, 110 and 114 in FIG. 1.

A common method of operation for a browser is to first obtain the primary data object. The primary data object typically comprises text render units and references to secondary data objects. After obtaining the primary data object, the browser proceeds sequentially through the object. When it encounters a text render unit, the browser renders and displays that text render unit. It then proceeds to the next line of the primary data object. When it encounters a reference to a secondary data object, the browser pauses rendering. It then requests the referenced secondary data object and waits to receive it. When it receives the referenced secondary data object, the browser renders and displays the image described by that secondary data object. It then proceeds to the next line of the primary data object. This continues until all of the primary data object and all secondary data objects referenced by the primary data object have been obtained, rendered, and displayed as a composite image 120.

Frequently, the primary data objects and the secondary data objects reside on a computer other than the computer running the browser. The two computers are connected by a network. FIG. 3 depicts an example of such a network. The example shows six computers 150, 160, 162, 164, 166 and 170 connected by communication links in a network. If computer 150 is a computer running a browser, and computer 170 is the computer where the data objects reside, there are a number of paths by which data may be transferred from one computer to another. For example, data may be transferred from server computer 170 to client computer 150 by passing transferring the data from server computer 170 through link 185 to computer 166; then from computer 166 through link 184 to computer 160; then from computer 160 through link 180 to client computer 150. Alternatively, the data may be transferred from server computer 170 to client computer 150 by passing transferring the data from server computer 170 through link 186 to computer 164; then from computer 164 through link 183 to computer 160; then from computer 160 through link 180 to client computer 150.

The actual path used is transparent to the browser. This transparency is depicted in FIG. 4. To the browser, the network 190 appears as a single path 192 between the computer 150 on which the browser is running and the computer 170 on which the data objects reside.

One objective of a browser is to provide as much information to the user as quickly as possible. To accomplish this, many browsers will, after obtaining the primary data object, immediately render and display a partial composite image. This partial composite image includes only the text from the primary data object. An image from a secondary data object will not be displayed immediately. Instead, in place of an image represented by a secondary data object, the browser will display a placeholder. The placeholder could, for example, be an icon or an empty box placeholder for each image that is represented by a secondary data object that has not yet been obtained. The browser will then obtain the secondary objects and complete the composite image by filling in the placeholders with image data rendered from the data in the secondary data objects. While this image data is being obtained, rendered and displayed, the user can typically reference the text data already displayed.

A browser will typically present a composite image in such a way that not all of the composite image is visible at any one time. For example, referring back to FIG. 2, the use of a window 140 to display a portion of the composite image 120 is illustrated. The window 140 displays the text lines 124 and 128, and the images 126 and 130. The text line 132 and the image 134 is out of the window range. The user may select other portions of the composite image 120 to view, through scrolling window 140 or other means.

There are two possible approaches to meet the goal of presenting the user with the most complete information as quickly as possible. The choice of approach depends on the bandwidth (i.e. the amount of data that can be transferred) of the data connection over which the data objects are being obtained.

If the data connection is a high-bandwidth connection (e.g., a 44,736,000 bits-per-second T3 line), the most effective approach is to request concurrent transfer of all the secondary data objects. A high-bandwidth connection can permit multiple data objects to be transferred concurrently with minimal impact upon the amount of time needed to transfer any one object. On a high-bandwidth connection, the time needed to concurrently transfer all secondary data objects will generally be close to the time needed to transfer the largest of the secondary data objects.

If the data connection is a low-bandwidth connection (e.g., a 2,400 bits-per-second serial connection), the most effective approach is to request each of the secondary data objects sequentially. A low-bandwidth connection cannot transfer multiple data objects concurrently without a significant impact on the amount of time needed to transfer objects already being transferred. On a low-bandwidth connection, the time needed to transfer all data objects concurrently will generally be close to the sum of times that would be needed to transfer each object individually. In the case of certain data transmission protocols, the time needed to transfer all data objects concurrently could exceed the sum. This is due to the inclusion of additional information to manage the concurrent transfers. This additional information could absorb a significant fraction of network bandwidth.

A further disadvantage to transferring concurrently on a low bandwidth connection is that much of the bandwidth will be spent transferring objects that will not be displayed in the initial window. Thus, where bandwidth is low, it is preferable to first transfer the objects that will be displayed in the initial window. These transfers can be performed before transferring the objects that represent images that will not be seen until the user scrolls the window. This approach is consistent with the objective of providing the user with as much information as quickly as possible.

Thus, it is desirable for a browser using a low-bandwidth connection to obtain the secondary objects sequentially. It is desirable for a browser using a high-bandwidth connection to obtain the secondary objects concurrently. In order for a browser to choose the appropriate approach, it must determine the bandwidth of the data communication connection. The bandwidth is related to the data transfer rate at which the communication connection is capable of operating.

Unfortunately, it is typically difficult for a browser to determine the bandwidth of the communications connection. In order to ensure operation in a number of different environments, the nature of the connection is transparent to the browser. The browser has no way of recognizing whether it is attached to the network by a high-speed connection such as a 44,736,000 bit-per-second T3 connection, or whether it is attached to the network by a low-speed connection such as a 2400 bit-per-second serial connection. In addition, connections that are capable of operating at relatively high speed may operate at relatively low speed if saturated due to a large number of concurrent users. Thus, even if the nature of the connection is known to the browser, this does not provide the browser with sufficient information about the effective transfer rate to choose a method of secondary object retrieval.

Furthermore, the path from the computer operating the browser to the computer where the data objects to be obtained reside may comprise multiple communication links of varying speed. The effective data transfer rate over this path is limited to the effective data transfer rate of the slowest link. However, information about that link is not directly available to the browser.

Finally, in the course of a browser session, a browser on a particular client can use a variety of servers. The browser may obtain primary and secondary data objects from each of these servers. The paths to these server computers could have widely varying transfer rates. A static determination of an effective transfer rate will yield undesirable results as different computers with different paths are used throughout the session.

It is therefore preferable to determine the effective data transfer rate for each primary data object obtained. Based on this information, the system may dynamically select between methods of obtaining data objects either sequentially or concurrently.

SUMMARY OF THE INVENTION

Briefly, the invention provides for the control of the transfer of data objects over a communications link. This is achieved by obtaining a representative data object having an object size and a transfer time over the communications link. The object size of the representative data object is determined. The transfer time of the representative data object is determined. An effective transfer rate for the communications link is determined using the transfer time and object size. The effective transfer rate is compared to a predetermined value. A number of transfers to perform concurrently is determined based upon the comparison.

BRIEF DESCRIPTION OF THE DRAWINGS

The present invention may be better understood, and its numerous objects, features, and advantages become apparent to those skilled in the art by referencing the accompanying drawings in which:

FIG. 3 depicts a set of computers connected in a network.

FIG. 4 depicts the client and server computers of FIG. 3 connected to the remainder of the network, which is schematically illustrated as a cloud.

DESCRIPTION OF SPECIFIC EMBODIMENTS

This invention facilitates the presentation of information to a computer user. In overview, when the user requests the information, a primary data object is requested from a server. When the primary data object is received, the effective data transfer rate for the primary data object is calculated. If the effective transfer rate is below a predetermined threshold, any secondary data objects are obtained sequentially. If the effective data transfer rate is greater than the predetermined threshold, the secondary data objects are obtained concurrently.

A common protocol used to obtain data objects over a network is the Hypertext Transfer Protocol (HTTP). HTTP is described in Berners-Lee, "Hypertext Transfer Protocol (HTTP) Internet Draft" (Nov. 5, 1993). Other transfer protocols will also provide equivalent capabilities.

HTTP generally uses the Transmission Control Protocol ("TCP") and Internet Protocol ("IP") as its access method. TCP is described in Information Sciences Institute, "Transmission Control Protocol DARPA Internet Program Protocol Specification (RFC 793)" (September, 1981). IP is described in Information Sciences Institute, "Internet Protocol DARPA Internet Program Protocol Specification (RFC 791)" (September, 1981). TCP and IP are collectively referred to as "TCP/IP." Other network protocols will also provide equivalent capabilities.

One embodiment of the invention is adapted to run in a Microsoft Windows environment in a computer based upon a microprocessor of the Intel x86 family architecture. Windows Sockets is an Application Program Interface ("API") that provides program functions to allow a computer program in a Microsoft Windows environment to execute TCP/IP system calls. Windows Sockets is described in Davis, "Windows Network Programming: How to Survive in a World of Windows, DOS, and Networks" (Addison-Wesley Publishing Co., 1993). The present invention may be practiced, and is here described, using the Windows Sockets API. Other APIs will also provide equivalent capabilities.

Obtaining the Primary Data Object

Figure 5:
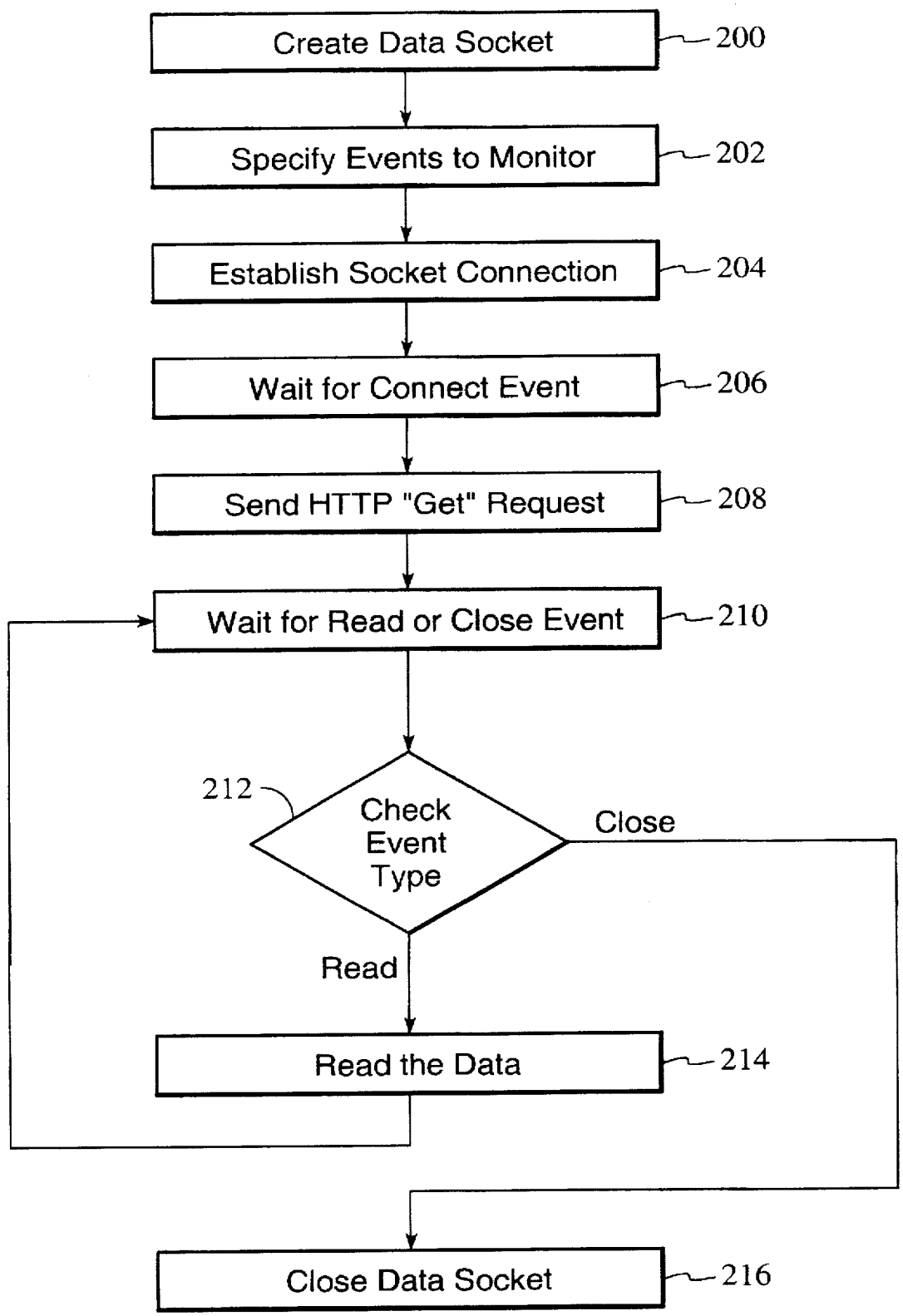
FIG. 5 depicts the substeps required by the invention to transfer a data object in an example applications programming interface.

FIG. 5 depicts one series of substeps that may be executed by a computer program that uses Windows Sockets as an API in order to obtain a data object.

Substep 200 is the substep of preparing a data area to represent a "socket," or logical connection from a client computer to a server computer in a network. Windows Sockets provides the program function "socket( )" to perform this substep.

Substep 202 is the substep of specifying events on a socket that will be monitored by the computer program referencing the socket. Events are signals that indicate a particular service that is being provided from a server computer to the client server. Examples include:

FD_READ Indicates that data is available to be read;

FD_WRITE Indicates that data may be written to the socket;

FD_CONNECT Indicates that a connection has been established on the socket;

FD_CLOSE Indicates that the socket has been closed (e.g., after data has been transferred).

In terms of the invention, the FD_READ, FD_CONNECT, and FD_CLOSE events will be monitored. Windows Sockets provides the function "WSAAsyncSelect( )" to perform this substep.

Substep 204 is the substep of requesting the establishment of a socket connection. Windows Sockets provides the program function "connect( )" to perform this substep.

Substep 206 is the substep of waiting for a socket connection to be established. The occurrence of the Windows Socket event FD_CONNECT indicates the establishment of a socket connection.

Substep 208 is the substep of requesting a data object to be transferred over the network. Windows Sockets provides the program function "send( )" to perform this substep. This substep causes a data packet to be transferred from the client computer to the server computer. In an environment using the HTTP protocol, this packet will contain an encoded HTTP "GET" request. The HTTP GET request identifies a data object residing on the server computer that is to be transferred to the client computer.

Substep 210 is the substep of waiting for a response from the server computer. A response may be an indication that some data of the requested data object has been placed in a buffer and is ready to be read by the program. Windows Sockets identifies this response with the FD_READ event. Alternatively, the response may be that all data from the requested data object has been sent and the socket has been disconnected by the server. Windows Sockets identifies this response with the FD_CLOSE event.

Substep 212 is the substep of checking the response received from the server computer. If the response indicates that some data has been sent and is ready to be read, the program proceeds to substep 214 to read the data from the buffer. Windows Sockets provides the program function "recv( )" to perform the substep of reading data from the buffer. After performing substep 214, the program returns to substep 210 to await the next indication that more data is ready to be read or that the transfer has been completed.

If substep 212 determines that the response indicates that all data from the requested data object has been sent and the socket has been disconnected by the server, the program proceeds to substep 216. Substep 216 is the substep of closing the data socket. Windows Sockets provides the program function "closesocket( )" to perform this substep.

Figure 6:
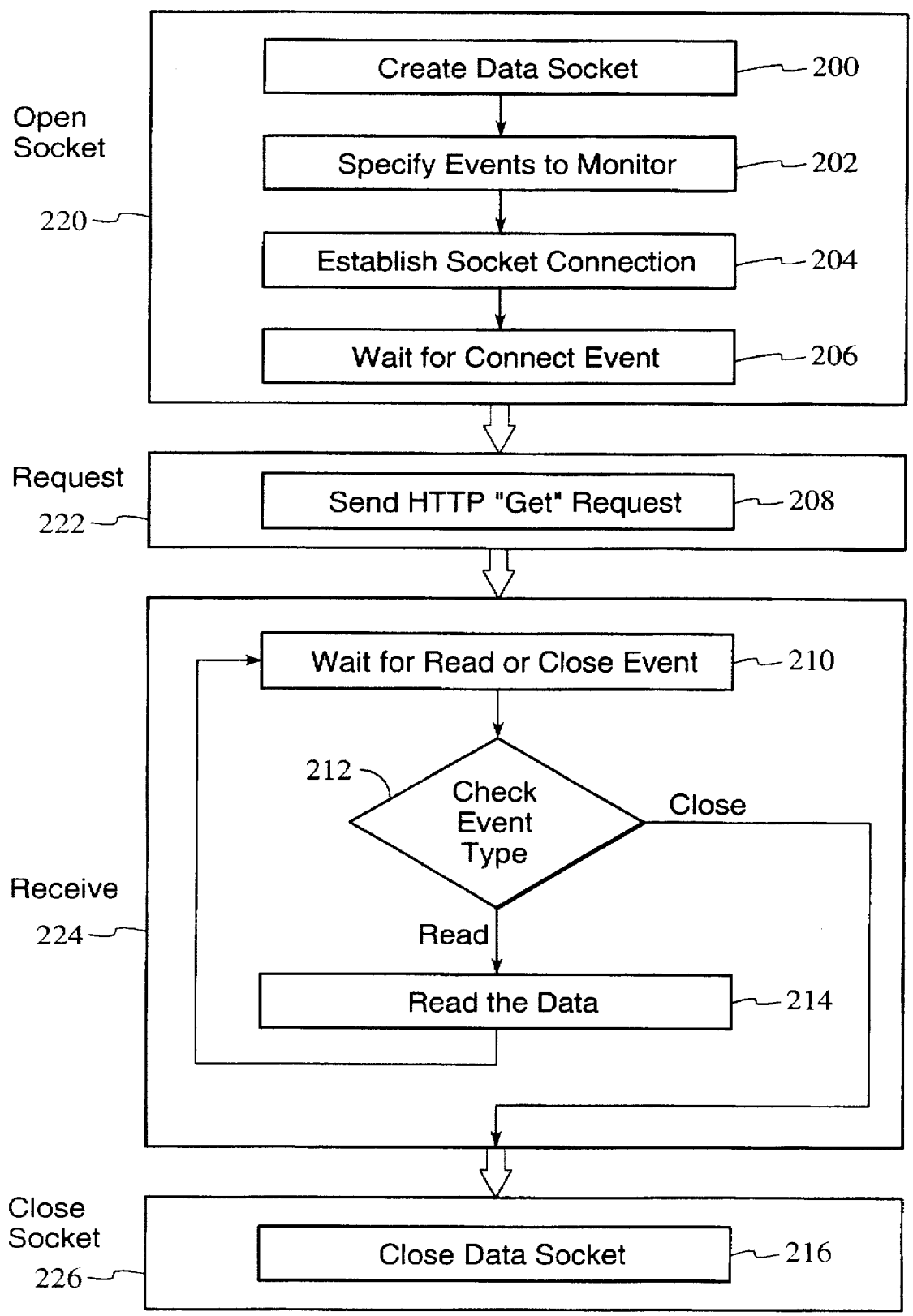
FIG. 6 relates the substeps of FIG. 5 to steps required to transfer a data object.

FIG. 6 indicates how combinations of one or more of these substeps may be combined to form steps. Thus, the combination of substeps 200, 202, 204, and 206 may be collectively viewed as the step 220 of "open socket." Likewise, the substep 208 of sending an HTTP "GET" request may be viewed as the step "request." The combination of substeps 210, 212, and 214 may be viewed as the step "receive." Finally, the substep 216 may be viewed as the step "close socket."

Figure 7A:
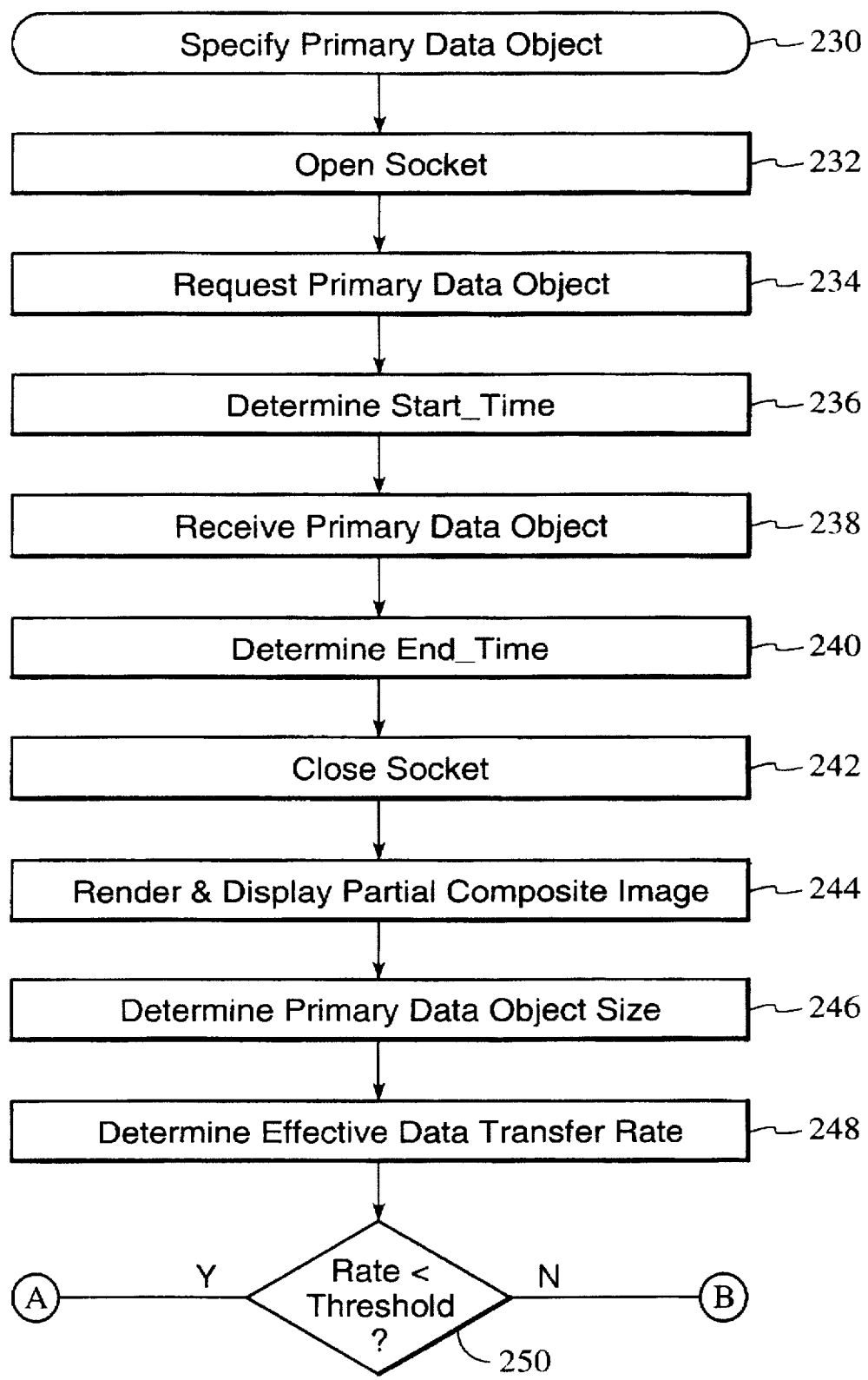
FIG. 7A is a flowchart depicting the process for transferring a primary data object, determining the effective data transfer rate of the communications link, and selecting a approach for transferring secondary data objects.
Figure 7B:
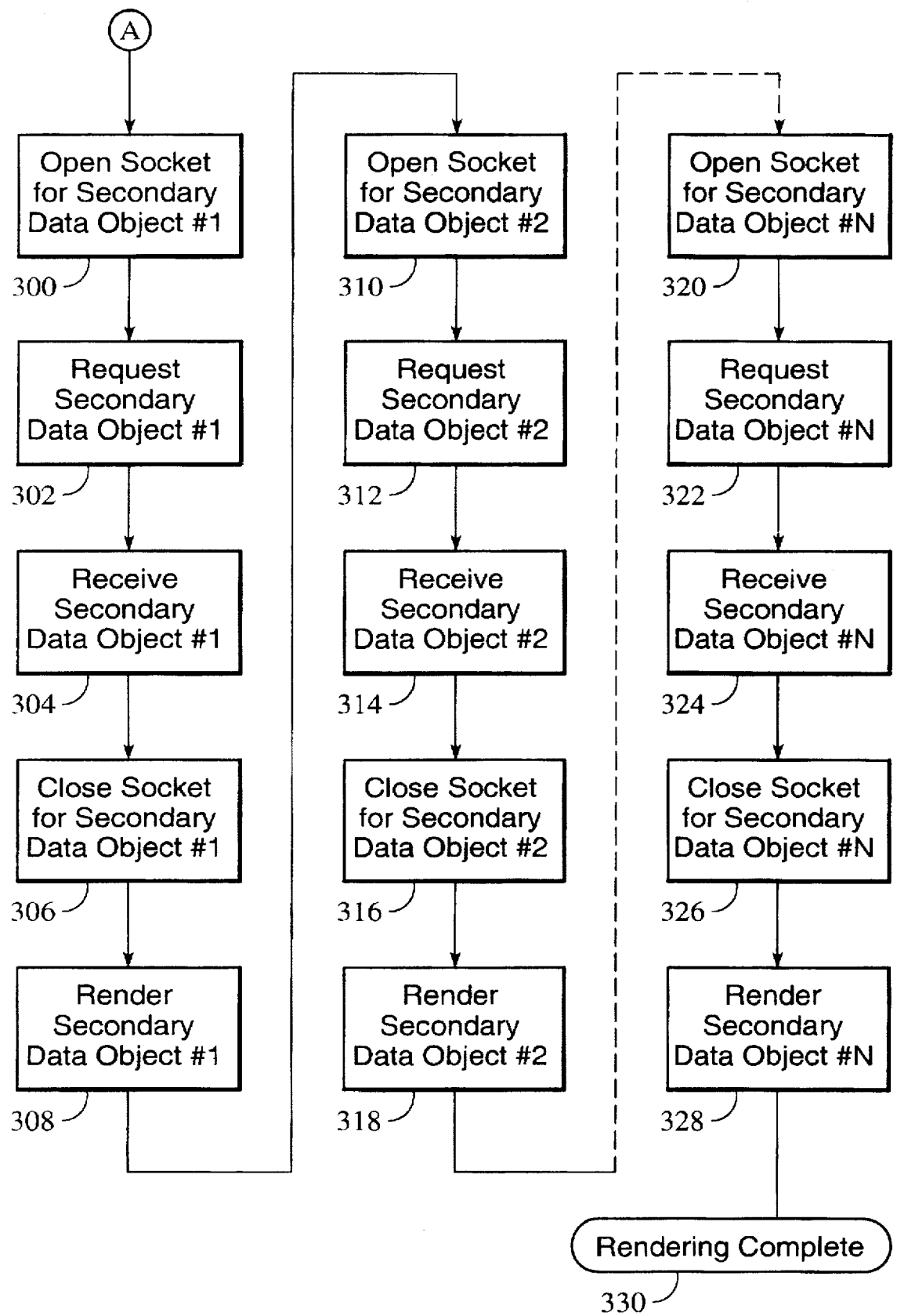
FIG. 7B is a flowchart depicting an approach for transferring multiple secondary objects sequentially.
Figure 7C:
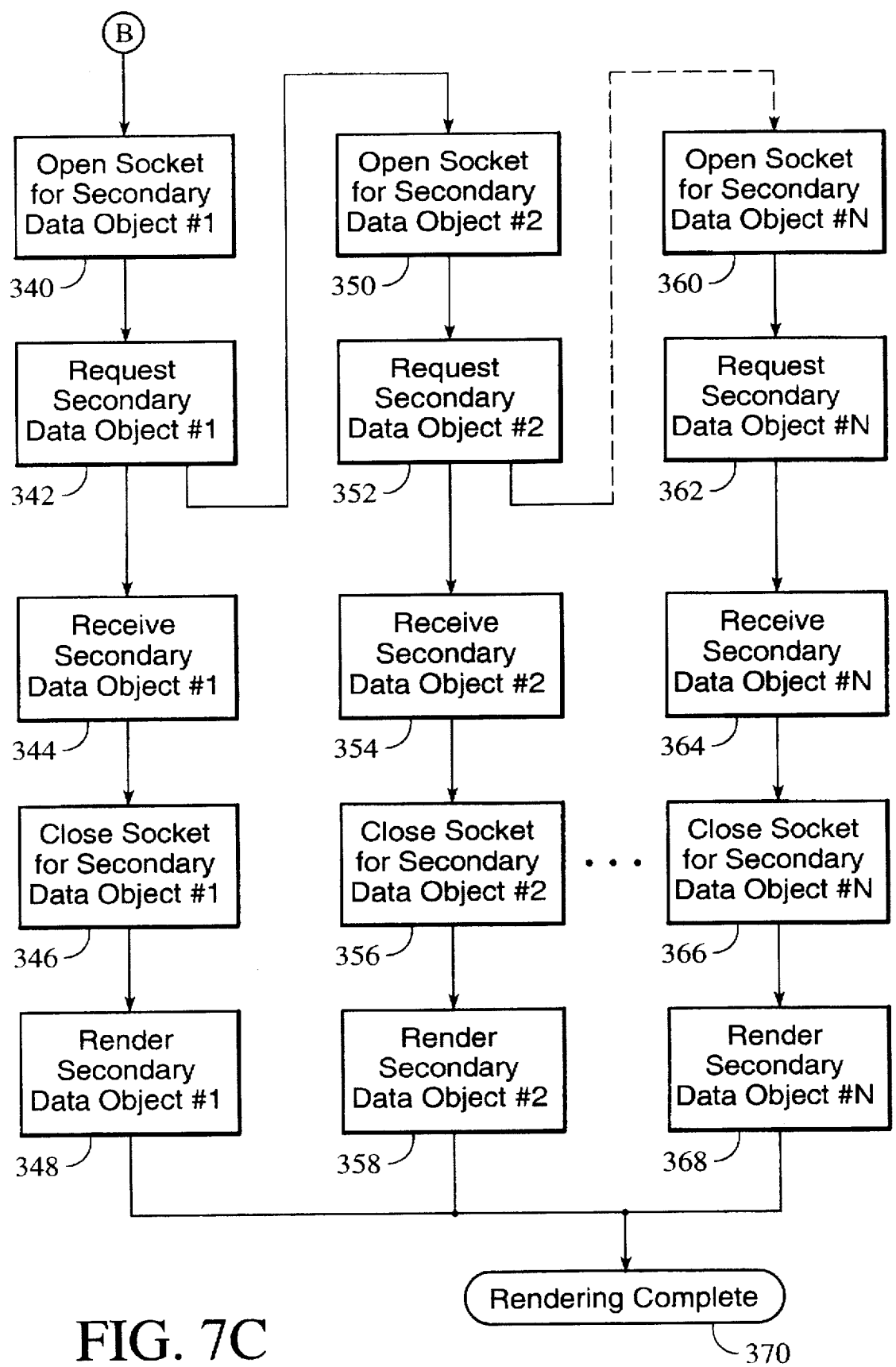
FIG. 7C is a flowchart depicting an approach for transferring multiple secondary objects concurrently.

FIGS. 7A, 7B, and 7C depict how the steps depicted in FIG. 6 may be used in the present invention. FIG. 7A depicts the steps of the invention that determine the effective data transfer rate of the primary data object and select the approach used to obtain the secondary data objects. FIG. 7B depicts the steps of the invention that obtain the secondary data objects sequentially. FIG. 7C depicts the steps of the invention that obtain the secondary data objects concurrently.

FIG. 7A depicts the steps of the invention that determine the effective data transfer rate of the primary data object and select the approach used to obtain the secondary data objects.

Specifying the Primary Data Object

Step 230 identifies the primary data object to be obtained. Primary data objects are identified by a Universal Resource Identifier ("URI"). URIs are well-known in the art and are described in Berners-Lee, "Universal Resource Identifiers in WWW: A Unifying Syntax for the Expression of Names and Addresses of Objects on the Network as Used in the World-Wide Web (RFC 1630)" (June, 1994). Generally, a URI is in the format of a Universal Resource Locator ("URL"). The URL provides three types of information: 1) the type of the data object; 2) the address of the computer on which the data object resides; and 3) the name by which the data object is known on the computer where it resides.

Types of data objects supported include:

HTTP Files to be obtained using the Hypertext Transfer Protocol;

FTP Files that may be obtained using the File Transfer Protocol;

Gopher Files that may be obtained using the Gopher protocol.

The address of the computer on which the data object resides is either a numeric IP address, or a symbolic address that can be translated to a numeric IP by means well-known to those skilled in the art. The name by which the data object is known on the computer where it resides is typically the name of a file.

Typically, the primary data object is identified either directly or indirectly by a user operating the browser. Certain images and text strings in HTML-format document can be associated with a URL. These images and strings are known as "anchor points." The most common means of specifying a URI is for a user to select an anchor point from an HTML-format document that is displayed as a composite image. This is most commonly performed by using a pointing device such as a mouse or trackball. The pointing device is used to position the cursor at an anchor point. The anchor point is then selected, typically by clicking a button associated with the pointing device. This action presents the browser with the URI associated with the anchor point.

Alternative means of supplying a URI include selecting from a menu of resources presented to the user by a presentation manager; manually entering the URI as a text string; and associating a URI as an initial URI to be used when the browser is initialized.

Obtaining the Primary Data Object

After the primary data object is specified in step 230, the invention proceeds to step 232. The browser, in step 232, opens a socket to communicate with the server computer 170. Referring again to FIG. 6, it can be seen that step 232 comprises a series of substeps. The browser performs substep 200 to prepare a data area to represent a socket. The browser performs substep 202 to specify that the socket will be monitored for FD_CONNECT events, FD_READ events and FD_CLOSE events. The browser performs substep 204 to request the establishment of a socket connection. The browser performs substep 206 to wait for the socket connection to be established. The occurrence of an FD_CONNECT event indicates that the socket connection is established, completing step 232.

Once the socket is opened in step 232, the browser requests the specified primary data object in step 234. The browser will cause a data packet to be transferred from the client computer to the server computer by means of the Windows Sockets "send( )" program function of an equivalent function. If the primary data object is of type HTTP, the data packet will contain an encoded HTTP "GET" request. For other protocols, such as FTP, Gopher, and others, the data packet will contain an analogous request.

After the primary data object is requested in step 234, the browser will determine, in step 236, the time at which the request for the primary object was requested. Typically, the time will be determined by referencing a system clock in the computer through a well-known means. The time of the request is then stored.

After the time of the request is stored in step 236, the browser will, in step 238, receive the primary data object that is transferred from the server computer 170. The browser will wait for a response from server computer 170. If the response indicates that data is being presented in a buffer, the browser executes the Windows Sockets "recv( )" program function to move the data from the buffer to a work area, which may be a location in memory or in magnetic storage. When moving the data, the browser counts the number of bytes transferred in the request. The count is stored in storage such as random access memory ("RAM") or a register. After performing the "recv( )" program function, the browser resumes waiting for a further response.

If the response indicates that all data from the requested data object has been transferred, the browser proceeds to step 240. In step 240, the browser determines the time at which all of the data that comprises the primary object was received. Typically, the time will be determined by referencing a system clock in the computer through a well-known means. The time of the receipt is then stored.

After the time of receipt has been determined in step 240, the browser, in step 242, closes the socket. At this point, the browser reads the received primary data object. The browser parses the primary data object into text render units that are capable of being immediately rendered. The browser builds a list of secondary data objects referenced by the primary object. The browser then renders and displays a partial composite image. The partial composite image is made up of rendered text from the primary data object, and placeholders in the positions where the primary data object contains references to secondary data objects.

Determining the Effective Data Transfer Rate

The browser then, as indicated by step 248, determines the effective data transfer rate for the primary data object. The browser calculates the total transfer time for the primary data object by subtracting the start time from the receipt time. The browser then divides the byte count for the primary data object by the total transfer time for the primary data object, yielding an effective data transfer rate for the primary data object.

The total transfer time may be determined by using points, other than those described above, at which to measure the start time and the receipt time. For example, if it is desirable to include the request time as part of the total transfer time, the system may determine the start time prior to initiating the transfer. Alternatively, the system may select a portion of the primary data object, sample the transfer time for that portion, and extrapolate that transfer time to a value for the entire data object.

Likewise, the total transfer time may be determined without determining the actual start time and receipt time. For example, a countdown clock or analogous device may be used.

Further, the size of the primary data object may be determined by means other than by counting the bytes in the object as it arrives. For example, the data object may be saved to a file system, and the file system may then be queried for the size of the stored data object.

Once the effective data transfer rate has been determined, this transfer rate is compared to a predetermined threshold value as indicated in step 250. A typical threshold value is 1000 bytes per second. If the effective data transfer rate is less than the threshold, the browser selects a sequential process to transfer the secondary data objects. The sequential process is depicted in FIG. 7B. If the effective data transfer rate is not less than the threshold value, the browser selects a concurrent process by which to transfer the secondary data objects. The concurrent process is depicted in FIG. 7C.

Obtaining the Secondary Objects Sequentially

As indicated, FIG. 7B depicts a sequential process to obtain the secondary data objects referenced by the primary data object. Each of n secondary data objects is obtained in a way similar to the way in which the primary object was obtained.

Figure 1:
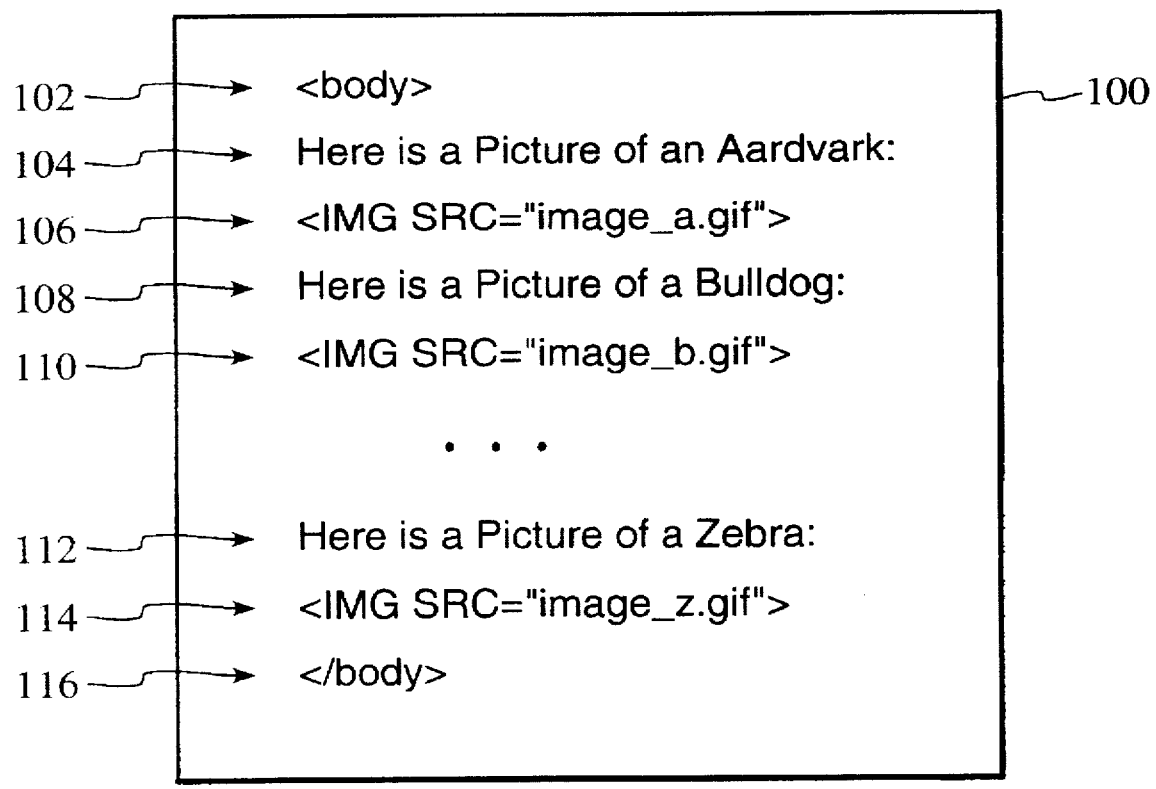
FIG. 1 depicts a fragment of a primary data object that represents an HTML document that contains multiple references to secondary data objects, each representing an image.
Figure 2:
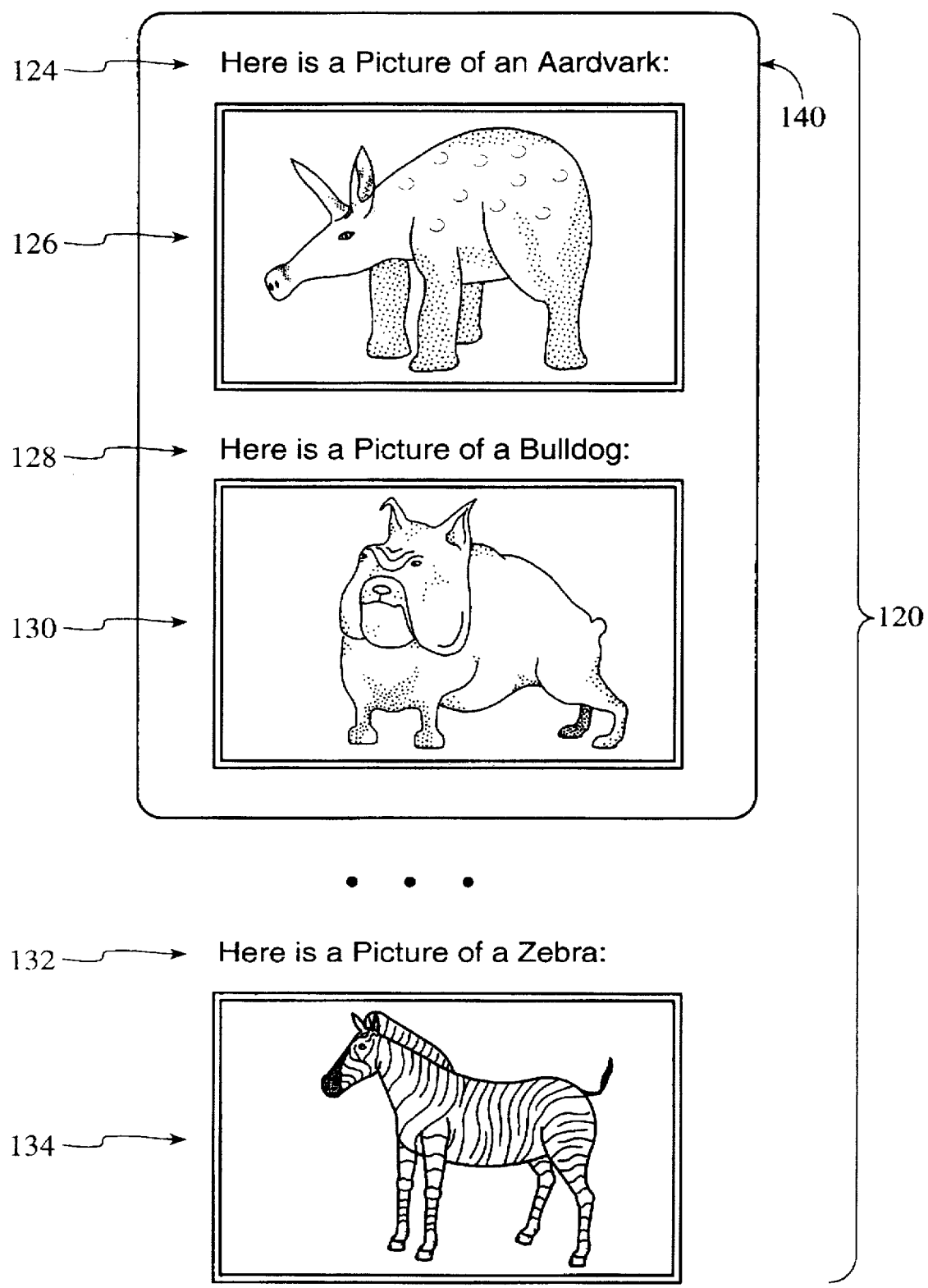
FIG. 2 depicts the fragment of FIG. 1 as rendered by a graphical browser.

The first secondary data object is obtained in steps 300 through 308. In step 300, the browser opens a socket for the first secondary data object. In step 302, the browser issues a single request for a transfer of the first secondary data object. In step 304, the first secondary data object is received. In step 306, the socket opened in step 300 is closed. In step 308, the first secondary data object is rendered and displayed as image 126 in the composite image 120 as depicted in FIG. 2.

After the first secondary data object is obtained, the second secondary data object is obtained in steps 310 through 318. In step 310, the browser opens a socket for the second secondary data object. In step 312, the browser issues a single request for a transfer of the second secondary data object. In step 314, the second secondary data object is received. In step 316, the socket opened in step 310 is closed. In step 318, the second secondary data object is rendered and displayed as image 130 in the composite image 120 as depicted in FIG. 2.

Steps similar to those to obtain the first and second secondary data objects are performed for each of the remaining secondary data objects. The steps to obtain the nth secondary data object are depicted as steps 320 through 328. In step 320, the browser opens a socket for the nth secondary data object. In step 322, the browser issues a single request for a transfer of the nth secondary data object. In step 324, the nth secondary data object is received. In step 326, the socket opened in step 320 is closed. In step 328, the nth secondary data object is rendered and displayed as image 134 the composite image 120 as depicted in FIG. 2.

Figure 8:
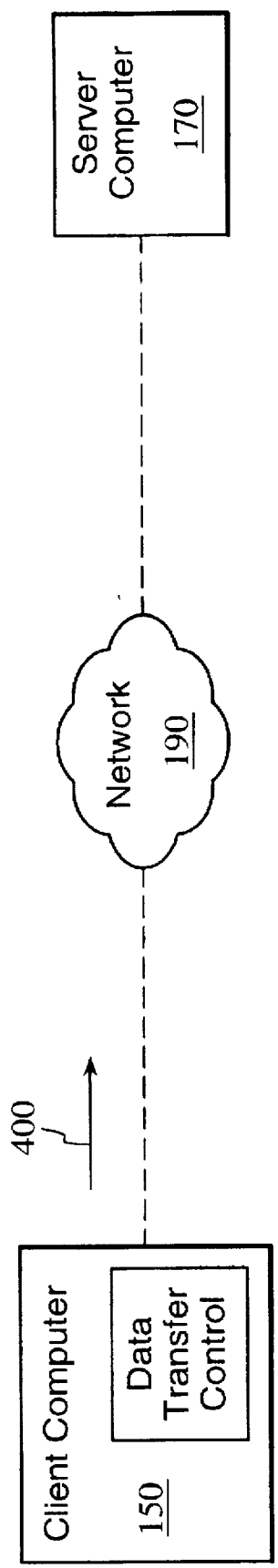
FIG. 8 depicts a request for a single data object to be transferred over a network.
Figure 9:
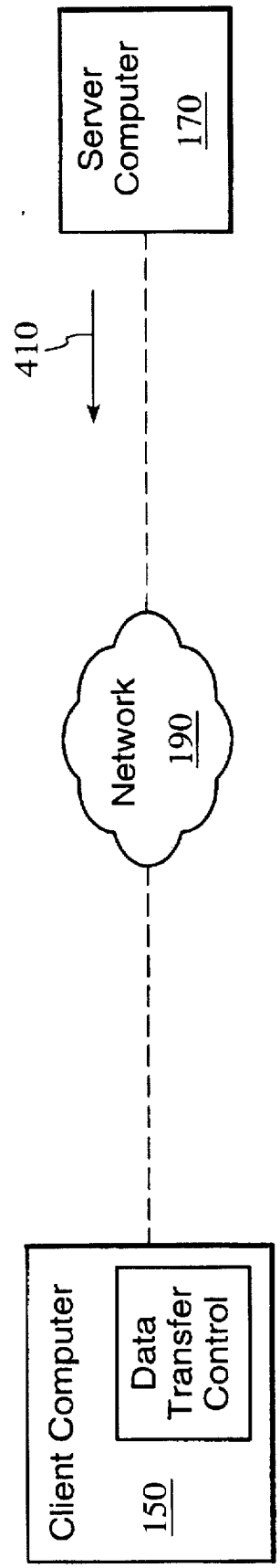
FIG. 9 depicts receipt of a single data object being transferred over a network.

In this sequential method, only one secondary data object is being transferred at any one time, as depicted in FIGS. 8 and 9. FIG. 8 depicts a single request 400 being sent from computer 150 to computer 170. FIG. 9 depicts a single data object 410 being transferred from computer 170 to computer 150. This sequential model is desirable in a low-bandwidth environment.

Obtaining Secondary Objects Concurrently

As indicated, FIG. 7C depicts a process to concurrently obtain the n secondary data objects referenced by the primary data object. The request for the first secondary data object is initiated in steps 340 and 342. In step 340, the browser opens a socket for the first secondary data object. In step 342, the browser issues a single request for a transfer of the first secondary data object.

After the request for the first secondary data object has been issued, the browser will begin to perform steps 344 through 348 to receive the first secondary data object. In step 344, the first secondary data object is received. In step 346, the socket opened in step 340 is closed. In step 348, the first secondary data object is rendered and displayed as image 126 in the composite image 120 as depicted in FIG. 2.

Concurrent with the receipt of the first secondary data object in steps 344 through 348, the browser initiates a request for the second secondary data object as shown in steps 350 through 352. In step 350, the browser opens a socket for the second secondary data object. In step 352, the browser issues a single request for a transfer of the second secondary data object.

After the request for the second secondary data object has been issued, the browser will begin to perform steps 354 through 358 to receive the second secondary data object. In step 354, the second secondary data object is received. In step 356, the socket opened in step 350 is closed. In step 358, the second secondary data object is rendered and displayed as image 130 in the composite image 120 as depicted in FIG. 2.

Concurrent with the receipt of the first secondary data object in steps 344 through 348, and the receipt of the second secondary data object in steps 354 through 358, the browser will similarly repeatedly proceed to initiate a request for each remaining secondary data object, through the final (nth) secondary data object, as shown in as shown in steps 360 through 362. In step 360, the browser opens a socket for the nth secondary data object. In step 362, the browser issues a single request for a transfer of the nth secondary data object. After the request for the nth secondary data object has been issued, the browser will begin to perform steps 364 through 368 to receive the nth secondary data object. In step 364, the nth secondary data object is received. In step 366, the socket opened in step 360 is closed. In step 368, the nth secondary data object is rendered and displayed as image 134 in the composite image 120 as depicted in FIG. 2.

Figure 10:
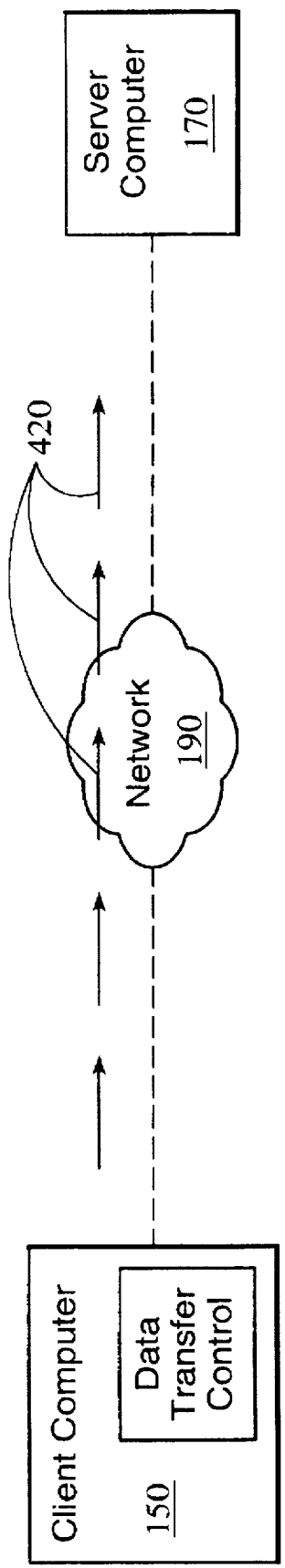
FIG. 10 depicts multiple requests for a plurality of data objects to be transferred over a network concurrently.
Figure 11:
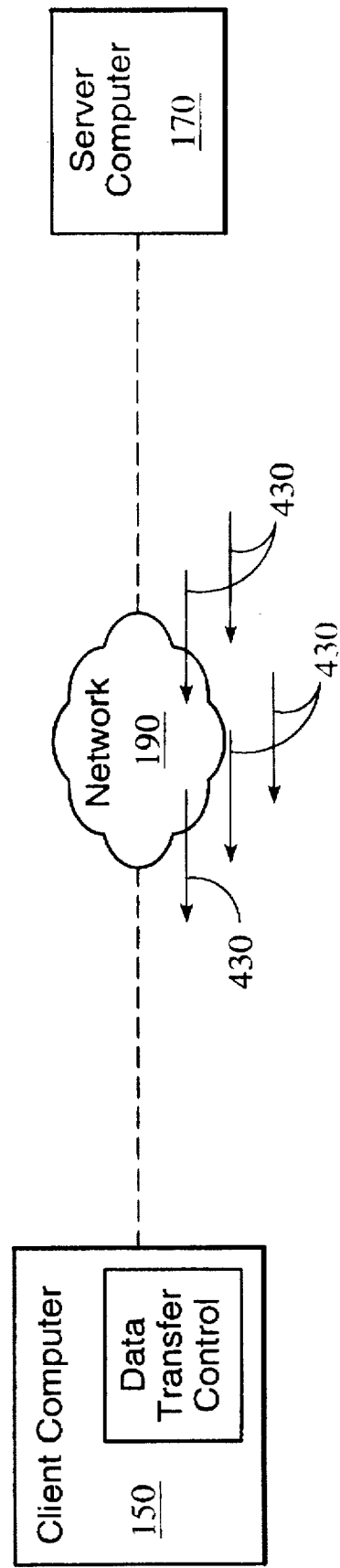
FIG. 11 depicts a plurality of data objects being transferred over a network concurrently.

The effect of requesting data transfers in this way is illustrated in FIGS. 10 and 11. FIG. 10 depicts consecutive multiple requests 420 being sent from computer 150 through network 190 to computer 170. FIG. 11 depicts a plurality of data objects 430 being transferred from computer 170 through network 190 to computer 150, in response to requests 420. This model permits overlapping of data object transfers: it is not necessary for a prior data object to have completed transfer before another data transfer begins. This concurrent model is desirable in a high-bandwidth environment.

In an alternative embodiment of the invention, the effective data transfer rate may be compared to entries in a table or equivalent structure to select one of a plurality of levels of concurrency between 1 and a number representing complete concurrency, to determine a desired number or range of concurrent transfers of secondary data objects. The desired number or range of concurrent transfers of secondary data objects may then be maintained using standard well known queuing techniques.

As is apparent from the above description, this invention facilitates the transfer of primary and secondary data objects in such a way that the composite image may be rendered and displayed in the manner most effective to the user. Although it has been described in terms of a client-server environment, it is also applicable to other environments, such as peer-to-peer communication.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A data processing system comprising:
   (a) a first computer;
   (b) a second computer in communication with the first computer through at least one communications link;
   (c) a means for obtaining a primary data object having an object size and a transfer time over the communications link, said primary data object being capable of identifying at least one secondary data object;
   (d) a means for determining the object size of the primary data object;
   (e) a means for determining the transfer time of the primary data object;
   (f) a means for determining an effective transfer rate for the communications link using the transfer time and object size;
   (g) a means for performing a comparison of the effective transfer rate to a predetermined value; and
   (h) a means for determining a number of concurrent secondary data object transfers to request based upon the comparison.

2. A method of controlling the transfer of data objects over a communications link, the method comprising the steps of:
   (a) obtaining a primary data object having an object size and a transfer time over the communications link;
   (b) determining the object size of the primary data object;
   (c) determining the transfer time of the primary data object;
   (d) determining an effective transfer rate for the communications link using the transfer time and object size;
   (e) performing a comparison of the effective transfer rate to a predetermined value;
   (f) determining a number of concurrent secondary data object transfers to request based upon the comparison.

3. The method of claim 2 wherein the number of concurrent secondary data object transfers to request is 1 where the effective transfer rate is less than the predetermined value.

4. The method of claim 2 wherein the number of secondary data object transfers to request is the number of concurrent secondary data object transfers that the communications link is capable of servicing, where the effective transfer rate is greater than the predetermined value.

5. The method of claim 2 wherein the primary data object represents a document in hypertext markup language format.

6. An apparatus for controlling the transfer of data objects over a communications link, the apparatus comprising:
   (a) a means for obtaining a primary data object having an object size and a transfer time over the communications link, said primary data object being capable of identifying at least one secondary data object;
   (b) a means for determining the object size of the primary data object;
   (c) a means for determining the transfer time of the primary data object;
   (d) a means for determining an effective transfer rate for the communications link using the transfer time and object size;
   (e) a means for performing a comparison of the effective transfer rate to a predetermined value;
   (f) a means for determining a number of concurrent secondary data object transfers to request based upon the comparison.

7. The apparatus of claim 6 wherein the number of concurrent secondary data object transfers to request is 1 where the effective transfer rate is less than the predetermined value.

8. The apparatus of claim 6 wherein the number of secondary data object transfers to request is the number of concurrent secondary data object transfers that the communications link is capable of servicing, where the effective transfer rate is greater than the predetermined value.

9. The apparatus of claim 6 wherein the primary data object represents a document in hypertext markup language format.

10. The apparatus of claim 6 in a data processing system comprising a plurality of computers connected by at least one communications link, said apparatus being contained in at least one of said plurality of computers.

11. A data processing system comprising a plurality of computers connected by at least one communications link, at least one of said plurality of computers including an apparatus for requesting transfer of data objects over said at least one communications link, said apparatus for requesting transfer having a means for determining an effective data transfer rate for said at least one communications link and a means for selecting between sequential and concurrent transfer of the data objects based on the effective data transfer rate.

12. A computer program product for controlling the transfer of data objects over a communications link, comprising a computer usable medium having computer readable code embodied therein for performing the steps of:
   (a) obtaining a primary data object having an object size and a transfer time over the communications link, said primary data object being capable of identifying at least one secondary data object;
   (b) determining the object size of the primary data object;
   (c) determining the transfer time of the primary data object;
   (d) determining an effective transfer rate for the communications link using the transfer time and object size;
   (e) performing a comparison of the effective transfer rate to a predetermined value; and
   (f) determining a number of concurrent secondary data object transfers to request based upon the comparison.

13. The computer program product of claim 12 wherein the predetermined value is 1000 bytes per second.

14. The computer program product of claim 12 wherein the number of secondary data object transfers to request is 1 where the effective transfer rate is less than the predetermined value.

15. The computer program product of claim 12 wherein the preferred number of secondary data object transfers to request is the number of secondary data object transfers that the communications link is capable of servicing, where the effective transfer rate is greater than the predetermined value.

16. The computer program product of claim 12 wherein the representative data object represents a document in hypertext markup language format.

* * * * *